United States Patent [19]

Hopkins et al.

[11] 4,271,197
[45] Jun. 2, 1981

[54] CHEWING GUM CONTAINING SUGAR SUBSTITUTE

[76] Inventors: Walter Hopkins, 175 Hobart Ave., Greenwich, Conn. 06830; Dominick R. Friello, King St., Danbury, Conn. 06810; Subraman R. Cherukuri, 3 Mendes Rd., Danbury, Conn. 06810; Raymond L. Roy, 38 Grammar School Dr., Danbury, Conn. 06810; Donald A. M. Mackay, 135 Deerfield La., Pleasantville, N.Y. 10570

[21] Appl. No.: 50,573

[22] Filed: Jun. 21, 1979

[51] Int. Cl.³ .............................................. A23G 3/30
[52] U.S. Cl. ........................................ 426/3; 426/658
[58] Field of Search ........................................ 426/3-6, 426/548, 658

[56] References Cited

U.S. PATENT DOCUMENTS

| Re. 26,959 | 9/1970 | Conrad | 426/548 |
| 3,352,689 | 11/1967 | Bilotti | 426/3 |
| 3,655,866 | 4/1972 | Bilotti | 426/3 |
| 3,666,492 | 5/1972 | Teng | 426/3 |
| 3,914,434 | 10/1975 | Bohni | 426/3 |

FOREIGN PATENT DOCUMENTS 899143  5/1972  Canada ........................................ 426/3

Primary Examiner—Jeanette M. Hunter
Attorney, Agent, or Firm—Lawrence S. Levinson; Burton Rodney

[57] ABSTRACT

A chewing gum is provided which has improved softness and flexibility retention, and prolonged shelf life and contains as a plasticizer and sweetener a combination of a hydrogenated starch hydrolysate and sorbitol, and optionally, mannitol, glycerin, and/or gum arabic. The above chewing gum has been found to have excellent extrudability properties and may be used in making sugarless bubble gums, standard sugarless gums as well as center-filled gums.

20 Claims, No Drawings

CHEWING GUM CONTAINING SUGAR SUBSTITUTE

FIELD OF THE INVENTION

The present invention relates to a sugarless chewing gum which contains as a plasticizer-sweetener, a combination of a hydrogenated starch hydrolysate and sorbitol, and optionally one or more other sugar alcohols or other sweeteners.

BACKGROUND OF THE INVENTION

The search continues for widely acceptable sugar substitutes for use as table sweeteners as well as in candies, other confectionaries, chewing gums and other sweet products. The ideal sugar substitute must have good sweetness properties with substantially little or no bitter or metallic aftertaste and no side effects. Perhaps even more important, it should not be fermentable and should not yield acid decomposition products which are regarded as a primary cause of dental caries. Examples of non-sugar sweetening agents which have been suggested, some of which actually are in use, include the saccharins, sugar alcohols, cyclamates, dihydrochalcones and the like.

In addition, U.S. Pat. No. Re. 26,959 to Conrad discloses a sugar substitute which is a hydrogenated starch hydrolysate prepared by hydrogenating a saccharified starch having a dextrose equivalent of 15–75% and containing dextrines, until substantially no dextrose and maltose remain. U.S. Pat. No. 3,556,811 and Canadian Pat. No. 899,143 to Smith discloses sugarless foods including confections such as candies and chewing gum which contain hydrogenated starch hydrolysate.

U.S. Pat. No. 3,352,689 to Bilotti discloses a sugarless gum which contains from 30 to 60% by weight of gum acacia in place of corn syrup together with gum base and other conventional chewing gum ingredients.

U.S. Pat. No. 3,655,866 to Bilotti discloses a sugarless chewing gum which contains a freely releasable form of dicalcium phosphate dihydrate prepared by coating or agglomerating dicalcium phosphate dihydrate powder with a water-soluble polyol. The dicalcium phosphate dihydrate powder combined with the polyol is present in an amount of from about 10 to about 40% by weight of the gum.

DESCRIPTION OF THE INVENTION

In accordance with the present invention, a chewing gum composition is provided which has improved softness retention properties and is easily extruded in conventional gum extrusion equipment, and in preferred embodiments has improved shelf life and long-term flexibility. The chewing gum composition of the invention includes gum base; and as a plasticizer-sweetener combination, a hydrogenated starch hydrolysate, for example, as disclosed in U.S. Pat No. Re. 26,959 and U.S. Pat. No. 3,556,811 and a major amount of sorbitol, optionally one or more other sugar alcohols, such as mannitol or xylitol; optionally one or more additional sweetening agents, such as sugar and/or non-sugar sweeteners; and optionally additional flavoring materials, one or more softeners, emulsifiers and/or fillers. The chewing gum of the invention does not need and does not contain an aqueous plasticizer or syrup such as corn syrup, and does not include lactose.

The preferred chewing gum composition of the present invention comprises a sugarless chewing gum wherein the hydrogenated starch hydrolysate is employed in combination with sorbitol powder, and optionally, liquid sorbitol, other sugar alcohols such as mannitol and/or xylitol, and/or gum arabic. The hydrogenated starch hydrolysate will be employed in a weight ratio to the sorbitol powder of within the range of from about 3:1 to about 1:30, preferably from about 0.9:1 to about 0.1:1, and more preferably from about 0.6:1 to about 0.1:1. Such preferred sugarless compositions contain from about 2 to about 60% by weight of hydrogenated starch hydrolysate, and preferably from about 2 to about 20% by weight hydrogenated starch hydrolysate, and the sorbitol powder is present in an amount within the range of from about 10 to about 75%, and preferably from about 10 to about 65% by weight.

In one embodiment of the invention, sorbitol syrup or solution may also be employed in a weight ratio of sorbitol powder:sorbitol solution of within the range of from about 6:1 to about 2:1.

In general, the sorbitol syrup may be present in an amount to provide from about 0 to about 10% by weight sorbitol and preferably from about 1 to about 8% sorbitol based on the weight of the final chewing gums. Use of the sorbitol in the form of the syrup or solution increases moisture content and thus softness of the gum.

In another embodiment of the invention, gum arabic, preferably in the form of a solution, is employed in combination with the hydrogenated starch hydrolysate and sorbitol powder to provide improved textural properties. The gum arabic will normally be employed as aqueous solutions containing from about 30 to about 60% gum arabic, so as to provide an amount of gum arabic of within the range of from about 0 to about 4%, and preferably from about 1 to about 3% by weight based on the weight of the chewing gum.

The chewing gum of the invention will also preferably include mannitol to provide improved sweetness, texture and processing. The mannitol will be present in an amount ranging from about 0 to about 20%, and preferably from about 5 to about 10% based on the weight of the chewing gum.

The hydrogenated starch syrup also referred to as hydrogenated starch hydrolysates, employed herein may include those disclosed in U.S. Pat No. Re. 26,959 or U.S. Pat. No. 3,556,811 as well as various hydrogenated glucose syrups and/or powders which contain sorbitol, hydrogenated disaccharides, hydrogenated tri- to hexa-saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose end groups to sorbitol end groups. In the case of hydrogenated glucose syrups, the total solids are made of from about 4 to about 30% sorbitol, from about 5 to about 65% hydrogenated disaccharides (that is, maltitol), from about 15 to about 75% tri- to hepta-hydrogenated saccharides, and from about 10 to about 65% hydrogenated saccharides higher than hepta.

Examples of particularly suitable hydrogenated starch hydrolysates include from about 6 to about 10% sorbitol, from about 25 to about 55% hydrogenated disaccharides, from about 20 to about 40% hydrogenated tri- to hepta-saccharides, and from about 15 to about 30% hydrogenated saccharides higher than hepta.

Another example of suitable hydrogenated starch hydrolysates include from about 8 to about 20% sorbitol, from about 5 to about 15% hydrogenated disaccharide, and from about 2 to about 75% hydrogenated tri- to penta-saccharide.

Particularly preferred are hydrogenated starch hydrolysates of the following compositions.

|  | Parts by Weight | | |
|---|---|---|---|
|  | 1 | 2 | 3 |
| Sorbitol | 10.5 | 17 | 15 |
| Hydrogenated disaccharides | 7.5 | 13 | 10 |
| Hydrogenated tri- to penta-saccharides |  | 20 | 70 |
| Hydrogenated saccharides higher than penta and higher saccharide alcohols | 62 | | |

|  | Parts by Weight | | | |
|---|---|---|---|---|
|  | 4 | 5 | 6 | 7 |
| Sorbitol | 5-8 | 6-8 | 6-8 | 5-8 |
| Hydrogenated disaccharides | 50-58 | 40-45 | 25-30 | 25-58 |
| Hydrogenated tri- to hexa-saccharides | 20-25 | 25-30 | 35-40 | 20-40 |
| Hydrogenated saccharides higher than hexa | 15-20 | 20-25 | 25-30 | 15-30 |

Where the above-described hydrogenated starch hydrolysate is employed in combination with the sorbitol and optionally mannitol and/or gum arabic, the resulting gum has been found to have a soft, pliable texture superior to sugarless formulations containing no hydrogenated starch hydrolysate. In addition, such chewing gum composition, which usually will be of the non-sugar type, has good softness retention properties and improved flexibility as it ages on the shelf and has excellent extrusion properties.

The hydrogenated starch hydrolysate as described above may be employed as a substitute for corn syrup or other plasticizer or softener, sugar and even sugar alcohols. A typical sugar-free gum formulation may contain from about 2 to about 70%, and preferably from about 4 to about 60% by weight of the hydrogenated starch hydrolysate. Such formulations may include the hydrogenated starch hydrolysate in the form of a powder and/or aqueous syrup; where present, the syrup (2 to 25% hydrogenated starch hydrolysate) will be employed in a weight ratio to the powder of within the range of from about 0.2:1 to about 0.5:1, and preferably from about 0.2:1 to about 0.3:1. The use of the hydrogenated starch hydrolysate in syrup form, as in the case of the sugar alcohols, increases moisture content of the gum formulation and thereby enhances softness properties thereof.

The hydrogenated starch hydrolysate preferably in the form of its syrup, may also be employed in bubble gum formulations to produce a soft, pliable product, the degree of softness being controllable by changing the amount of syrup employed. In the bubble gum formulations of the invention, the hydrogenated starch hydrolysate may be employed with or without sugar (which when present will provide from about 10 to about 90% by weight of the bubble gum formulation) or with artificial or non-sugar sweeteners as described herein.

The chewing gum will include a relatively water-insoluble, water-impenetrable gum base in an amount ranging from about 8 to about 50%, and preferably from about 15 to 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I | |
| Ester gum | 88 |
| Rubber latex solids | 10 |
| Lecithin | 2 |
| Base II | |
| Chicle | 30 |
| Jelutong | 60 |
| Gutta soh | 8 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum with or without conventional preservatives.

As indicated, the hydrogenated starch hydrolysate may be employed in conjunction with a natural sugar or non-sugar sweetener. The natural sugar may be present in an amount ranging from about 85 to about 0.05%.

The term "natural sugar" includes one or more sugars or sugar containing material, for example, monosaccharides, disaccharides and polysaccharides, some examples of which follow:

A. Monosaccharides of 5 or 6 carbon atoms—arabinose, xylose, ribose, glucose, mannose, galactose, fructose, dextrose, or sorbose or mixtures of two or more of the foregoing monosaccharides.
B. Disaccharides—sucrose such as cane or beet sugar, lactose, maltose or cellobiose; and
C. Polysaccharides—partially hydrolyzed starch, dextrin or corn syrup solids.

In addition, as mentioned hereinbefore, the hydrogenated starch hydrolysate may be employed together with artificial sweeteners (also referred to as non-sugar sweeteners or sugar substitutes), such as poorly or readily water-soluble sweeteners, such as the free acid form of saccharin, sodium calcium or ammonium saccharin salts, dihydrochalcones, glycyrrhizin, dipotassium glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscoreophyllum cumminsii* (Serendipity Berry), free cyclamic acid and cyclamate salts, and the like, or mixtures of any two or more of the above.

The chewing gum of the invention may also contain conventional ester gums, polydextrose, fillers, such as calcium carbonate, and texturizers, such as hydrated alumina, plasticizers, softeners or emulsifiers, such as lecithin, fatty acids, glycerin, glyceryl monostearate, hydrogenated vegetable oils, sorbitan monostearate, tallow, isomaltitol, propylene glycol, F.D.&C. coloring agents, and other conventional chewing gum additives as will be apparent to those skilled in the art.

The chewing gum of the invention may be prepared employing conventional chewing gum manufacturing techniques. However, the various sweeteners and/or hydrogenated starch hydrolysate may be provided in a form to ensure relatively slow release or slow solubilization in the saliva. Thus, for example, the sweetener and/or hydrogenated starch hydrolysate may be coated with, integrated with or encapsulated with non-toxic water-insoluble polymeric substances such as polyvinyl esters disclosed in U.S. Pat. Nos. 3,826,847 and 3,795,744, organic acids as disclosed in U.S. Pat. No. 3,761,288, or other known edible materials as, for example, any of the fusing agents disclosed in U.S. Pat. No. 3,928,633, as well as hydrophilic colloids such as ethyl cellulose, paraffin wax or sodium alginate. The sweetener and/or hydrogenated starch hydrolysate so-modified and employed in conjunction with conventional carriers as described above, will be slowly solubilized in the saliva over extended periods of time.

Alternatively, where it is desired to achieve slow release, the non-sugar (artificial) sweetener (where employed) will be in particulate form having an average particle size of below about 150 microns (0.150 mm or about 100 mesh), and will be incorporated into the gum base portion of the chewing gum. The particulate compound will be substantially retained in the gum base, and during chewing undergoes slow and controlled release into the saliva.

The chewing gum of the invention may be prepared by mixing melted gum base (heated at, for example 160°–170° F.) and color, adding about one-third of the hydrogenated starch hydrolysate and mixing for 1 to 3 minutes, if desired, adding polyol, such as mannitol, to the mix, and mixing for 1–5 minutes, adding sorbitol (in the form of powder), and softener, such as lecithin, flavor, and glycerin (where employed), and when a smooth mixture is obtained, optionally, adding sorbitol solution, then adding the remaining hydrogenated starch hydrolysate alone or with gum arabic, and then optionally adding spray-dried flavor and mixing the entire mass for 2 to 5 minutes.

If desired, the above may be mixed with one or more easily extractable water-soluble sweeteners, such as natural sugar, soluble saccharin salts, aspartame, water-soluble food acid and/or flavors. The resulting mix is then formed into sticks or tablets of chewing gum employing conventional techniques.

Where, in the above method, it is desired to employ a soluble non-sugar sweetener in a chewing gum containing an aqueous plasticizer (such as the hydrogenated starch hydrolysate in syrup form), the soluble non-sugar sweetener will be added to the gum base ingredients before the aqueous plasticizer is added thereto. In this manner, the soluble non-sugar sweetener will be transferred to the gum base and will not be first dissolved in the plasticizer.

Regardless of the solubility of the non-sugar sweetener to be added, where long lasting flavor or sweetness is desired, whether it be the hydrogenated starch hydrolysate and/or other sweetener, it is preferred that the particles of artificial sweetener have an average particle size of less than 150 microns to ensure slow controlled release into the saliva.

Preferred sugarless chewing gums in accordance with the present invention wherein the hydrogenated starch hydrolysate is employed as a sugar substitute for bulking purposes will have the following compositions:

|  | Parts by Weight |
| --- | --- |
| Gum base | 20–35 |
| Mannitol | 0–18 |
| Flavor | 0.5–2.5 |
| Sorbitol | 40–65 |
| Softener (e.g., lecithin) | 0.1–2 |
| Hydrogenated starch hydrolysate (on dry basis) | 10–20 |
| Gum arabic (based on 30–70% solution) | 0–12 |
| Glycerin | 0–4 |
| Water | — |

Preferred sugarless chewing gum formulations in accordance with the present invention wherein hydrogenated starch hydrolysate is the sole binding agent and aid in processing are as follows.

|  | Parts by Weight |
| --- | --- |
| Gum base | 20–35 |
| Mannitol | 4–18 |
| Flavor oil | 0.5–2.5 |
| Sorbitol powder | 30–55 |
| Softener (e.g., lecithin) | 0.1–2 |
| Hydrogenated starch hydrolysate (on dry basis) | 10–18 |
| Glycerin | 0–4 |
| Water | — |

Preferred sugarless chewing gum formulations in accordance with the present invention wherein hydrogenated starch hydrolysate is employed in conjunction with gum arabic solutions to aid in extrusion are as follows.

|  | Parts by Weight |
| --- | --- |
| Gum base | 18–30 |

-continued

| | Parts by Weight |
|---|---|
| Mannitol | 0–10 |
| Flavor oil | 0.5–2.5 |
| Sorbitol powder | 40–65 |
| Softener (e.g., lecithin) | 0–2 |
| Gum arabic solution (40 to 60% gum arabic) | 4–10 |
| Hydrogenated starch hydrolysate (dry basis) | 5–12 |
| Glycerin | 1–4 |
| Water | — |

Preferred sugarless chewing gums in accordance with the present invention wherein the hydrogenated starch hydrolysate is employed in conjunction with sorbitol solution (as plasticizer) will have the following compositions:

| | Parts by Weight |
|---|---|
| Gum base | 18–30 |
| Hydrogenated starch hydrolysate (powder) | 5–12 |
| Mannitol | 0–10 |
| Sorbitol powder | 40–60 |
| Sorbitol liquid (50 to 80% solution) | 10–20 |
| Glycerin | 0–4 |
| Softener (lecithin) | 0.1–2 |
| Flavor | 0.5–2.5 |

Most preferred sugarless gum formulations in accordance with the present invention are as follows:

| | Parts by Weight |
|---|---|
| Gum base | 20–30 |
| Mannitol | 3–12 |
| Hydrogenated starch hydrolysate (dry basis) | 12–20 |
| Sorbitol | 40–65 |
| Softener (lecithin) | 0–1.5 |
| Glycerin | 0–4 |
| Flavor | 0.3–2 |

The above chewing gums are particularly suitable for use in making liquid center chewing gum wherein the chewing gum is extruded about a core of liquid center fill.

The following Examples illustrate preferred embodiments of the present invention without, however, limiting the same thereto. All temperatures are expressed in °F.

EXAMPLE 1

A sugarless chewing gum is prepared from the following ingredients:

| | Parts by Weight |
|---|---|
| Gum base | 30 |
| Mannitol | 15 |
| Sorbitol powder | 40 |
| Hydrogenated starch hydrolysate powder (78% solids, including 6% sorbitol and 56% maltitol) | 12 |
| Softener (lecithin) | 1 |
| Spearmint oil | 1 |
| Color | 0.1 |

The gum base is melted (160°–175° F.) and placed in a pre-heated standard dough mixer equipped with sigma blades. Color is added and mixed for 3–4 minutes. About one-third of the hydrogenated starch hydrolysate powder is added and mixed for 1–3 minutes. Mannitol is added and mixed for 1–2 minutes. Thereafter, the sorbitol is slowly added followed immediately with lecithin and flavor and mixed for about 2–3 minutes. The remaining hydrogenated starch hydrolysate is added and the mixture mixed for 2–5 minutes.

The chewing gum prepared above is found to have a pleasant sweet taste, good softness retention and improved flexibility properties upon aging and excellent extrusion properties.

EXAMPLES 2 AND 3

Sugarless chewing gums are prepared from the following ingredients employing the procedure outlined in Example 1 except that glycerin is added directly after the sorbitol powder.

| | Parts by Weight | |
|---|---|---|
| | Ex. 2 | Ex. 3 |
| Gum base | 22 | 24 |
| Mannitol | 8 | 10 |
| Sorbitol powder | 50 | 47 |
| Hydrogenated starch hydrolysate syrup (on dry basis) | 16 | 15 |
| Glycerin | 2 | 2 |
| Lecithin | 0.5 | 0.5 |
| Fruit flavor | 1.5 | 0 |
| Spearmint flavor | 0 | 1.2 |
| Color | 0.05 | 0.1 |

The Examples 2 and 3 chewing gums are found to have a pleasant sweet taste, good softness retention, improved flexibility properties and excellent extrusion properties.

EXAMPLES 4 TO 6

A sugarless chewing gum is prepared from the following ingredients employing the procedure outlined in Examples 2 and 3 except that in Examples 4 and 6 mannitol is not employed, and gum arabic solution (50%) is added after the hydrogenated starch hydrolysate.

| | Parts by Weight | | |
|---|---|---|---|
| | Ex. 4 | Ex. 5 | Ex. 6 |
| Gum base | 22 | 20 | 22 |
| Mannitol | — | 5 | — |
| Sorbitol powder | 58 | 56 | 58 |
| Hydrogenated starch hydrolysate (on dry basis) | 8 | 8 | 8 |
| Lecithin | 0.5 | 0.5 | 0.5 |
| Flavor (liquid) | 1.5 | 1 | 1 |
| Glycerine | 2 | 2 | 2 |
| Gum arabic solution (50%) | 8 | 7 | 8 |

The Examples 4 to 6 chewing gums are found to have a pleasant sweet taste, good softness retention, improved flexibility properties and excellent extrusion properties.

EXAMPLES 7 TO 9

Sugarless chewing gums are prepared from the following ingredients.

|  | Parts by Weight | | |
| --- | --- | --- | --- |
|  | Ex. 7 | Ex. 8 | Ex. 9 |
| Gum base | 22 | 22 | 22 |
| Sorbitol powder | 54 | 48 | 47 |
| Sorbitol solution (70%) | 13 | 12 | 12 |
| Hydrogenate starch hydrolysate (dry basis) | 8.5 | 8 | 10 |
| Mannitol | — | 8 | 5 |
| Lecithin | 0.05 | 0.5 | 0.5 |
| Flavor | 1.7 | 1.6 | 1.2 |
| Color | 0.07 | 0.05 | 0.1 |
| Glycerin | — | — | 2 |

A procedure similar to that described in Examples 1 to 6 is employed except that sorbitol solution and color are added before the remaining hydrogenated starch hydrolysate is added.

The above chewing gum is found to have properties similar to that of the Examples 4 to 6 gums.

EXAMPLES 10 TO 12

Sugarless chewing gums are prepared from the following ingredients.

|  | Parts by Weight | | |
| --- | --- | --- | --- |
|  | Ex. 10 | Ex. 11 | Ex. 12 |
| Gum base | 25 | 25 | 25 |
| Sorbitol (dry) | 47 | 52 | 52 |
| Hydrogenated starch hydrolysate (dry basis) | 16 | 16 | 16 |
| Mannitol | 10 | 5 | 5 |
| Lecithin | 0.2 | 0.2 | — |
| Flavor | 2 | 2 | 2 |

A procedure similar to that described in Examples 1 to 6 is employed in preparing the above gums.

The above chewing gums are found to have properties similar to that of the Examples 4 to 6 gums.

EXAMPLES 13 TO 16

Sugarless bubble gums are prepared from the following ingredients.

|  | Parts by Weight | | | |
| --- | --- | --- | --- | --- |
|  | Ex. 12 | Ex. 14 | Ex. 15 | Ex. 16 |
| Bubble gum base | 22 | 26 | 26 | 22 |
| Sorbitol (dry) | 57 | 49 | 49 | 46 |
| Hydrogenated starch hydrolysate (dry basis) | 15 | 18 | 18 | 16 |
| Mannitol | 5 | 5 | 5 | 5 |
| Lecithin | 0.2 | 0.3 | — | 0.5 |
| Flavor | 0.7 | 1.5 | 1.5 | 1.5 |
| Glycerin | — | — | — | 2.3 |

A procedure similar to that described in Examples 1 to 6 is employed in preparing the above bubble gums.

The above bubble gums are found to have a pleasant sweet taste, excellent softness retention, and improved flexibility and extrusion properties.

What is claimed is:

1. A chewing gum having improved softness retention and flexibility and excellent extrudability consisting essentially of from about 8 to about 50% by weight of gum base, from about 2 to about 70% by weight of a hydrogenated starch hydrolysate the solids portion of which comprises from about 4 to about 20% sorbitol, from about 5 to about 65% hydrogenated disaccharides, from about 15 to about 75% tri- to hepta-hydrogenated saccharides, and from about 10 to about 65% hydrogenated saccharides higher than hepta, and further including from 0 to about 85% by weight sorbitol in addition to said sorbitol present in said hydrogenated starch hydrolysate, from 0 to about 20% by weight mannitol, optionally xylitol, from 0 to about 90% by weight of a natural sugar, optionally artificial sweeteners in addition to sorbitol and the hydrogenated starch hydrolysate, from 0 to about 15% by weight calcium carbonate, from 0 to about 2% by weight lecithin, from 0 to about 8.4% by weight gum arabic, from 0 to about 4% by weight glycerin, and flavor.

2. The chewing gum as defined in claim 1 wherein said hydrogenated starch hydrolysate is employed as a substitute for sugar.

3. The chewing gum as defined in claim 2 further including one or more artificial sweeteners in addition to the hydrogenated starch hydrolysate.

4. The chewing gum as defined in claim 2 further including xylitol, sorbitol or mannitol.

5. The chewing gum as defined in claim 4 further including one or more artificial sweeteners.

6. The chewing gum as defined in claim 4 including sorbitol in addition to that present in said hydrogenated starch hydrolysate, and said hydrogenated starch hydrolysate is employed in a weight ratio to said additional sorbitol within the range of from about 3:1 to about 1:30.

7. The chewing gum as defined in claim 1 wherein said hydrogenated starch hydrolysate is present in an amount within the range of from about 2 to about 60% by weight.

8. The chewing gum as defined in claim 7 including from about 10 to about 75% by weight sorbitol.

9. The chewing gum as defined in claim 7 in the form of a sugarless gum wherein the hydrogenated starch hydrolysate is present in the form of a mixture of powder (45–65% by weight of gum) and syrup (5 to 15% by weight of gum) and further including from about 0.05 to about 1.5% by weight artificial sweetener, and from 0 to about 15% by weight calcium carbonate.

10. The chewing gum as defined in claim 7 further including from about 0.5 to about 85% by weight natural sugar.

11. The chewing gum as defined in claim 10 in the form of a bubble gum comprising from about 13 to about 20% by weight gum base, from about 45 to about 65% by weight sugar, and from about 0.01 to about 3% by weight lecithin.

12. The chewing gum as defined in claim 7 in the form of a sugarless gum comprising from about 20 to about 35% by weight gum base, from about 40 to about 65% by weight sorbitol, from about 10 to about 20% by weight hydrogenated starch powder, from 0 to about 12% by weight mannitol, and from about 0 to about 2% by weight lecithin.

13. The chewing gum as defined in claim 12 comprising from about 20 to about 30% by weight gum base, from about 3 to about 12% by weight mannitol, from about 40 to about 55% by weight sorbitol, from about 14 to about 20% by weight hydrogenated starch hydrolysate, and from 0 to about 0.5% by weight lecithin.

14. The chewing gum as defined in claim 1 further including a sweetener selected from the group consisting of one or more natural sugars, sugar alcohols, non-sugar substitutes selected from the group consisting of the free acid form of saccharin, sodium saccharin, calcium saccharin, ammonium saccharin, dihydrochalcones, glycyrrhizin dipotassium glycyrrhizin, glycyrrhizic acid ammonium salt, L-aspartyl-L-phenylalanine methyl ester, *Stevia rebaudiana, Richardella dulcifica, Dioscoreophyllum cumminsii,* free cyclamic acid, cyclamate salts, or mixtures thereof, and one or more chewing gum additives selected from the group consisting of one or more ester gums, polydextrose, calcium carbonate, hydrated alumina, lecithin, fatty acids, glycerine, glyceryl monostearate, hydrogenated vegetable oils, magnesium stearate, xanthan gum, alginate gum, talc, sorbitan monostearate, tallow, propylene glycol, flavors, colorants or mixtures thereof.

15. The chewing gum as defined in claim 14 wherein said hydrogenated starch hydrolysate is prepared by hydrogenating saccharified starch having a dextrose equivalent of 15–75% and containing dextrines until substantially no dextrose and maltose remain.

16. The chewing gum as defined in claim 1 wherein said solids portion of said hydrogenated starch hydrolysate contains from about 6 to about 10% sorbitol, and from about 25 to about 55% by weight hydrogenated disaccharides, from about 20 to about 40% hydrogenated tri- to hepta-saccharides, and from about 15 to about 30% hydrogenated saccharides higher than hepta.

17. The chewing gum as defined in claim 1 wherein said solids portion of said hydrogenated starch hydrolysate contains from about 8 to about 20% sorbitol, and from about 5 to about 15% by weight hydrogenated disaccharides, and from about 20 to about 75% hydrogenated tri- to penta- saccharides.

18. The chewing gum as defined in claim 1 wherein said hydrogenated starch hydrolysate comprises from about 5 to about 8% sorbitol, from about 25 to about 58% hydrogenated disaccharides, from about 20 to about 40% hydrogenated tri- to hexa-saccharides and from about 15 to about 30% hydrogenated saccharides higher than hexa.

19. The chewing gum as defined in claim 1 comprising from about 20 to about 30 parts by weight gum base, from about 3 to about 12 parts by weight mannitol, from about 12 to about 20 parts by weight hydrogenated starch hydrolysate, from about 40 to about 65 parts by weight sorbitol, from about 0 to about 3 parts by weight glycerin and from about 0 to about 1.5 parts by weight lecithin.

20. The chewing gum as defined in claim 1 wherein said sorbitol present in addition to said sorbitol of said hydrogenated starch hydrolysate comprises sorbitol powder and sorbitol syrup, in a weight ratio of sorbitol powder:sorbitol syrup of within the range of from about 6:1 to about 2:1.

* * * * *

UNITED STATES PATENT AND TRADEMARK OFFICE
CERTIFICATE OF CORRECTION

PATENT NO. : 4,271,197

DATED : June 2, 1981

INVENTOR(S) : Walter Hopkins et al.

It is certified that error appears in the above-identified patent and that said Letters Patent are hereby corrected as shown below:

Column 7, line 41 should read --Glycerin    0-3 --.
Column 9, line 11 should read --Lecithin    0.5    0.5    0.5 --.
Column 10, line 46, "0.5" should read --0.05 --.

Signed and Sealed this

Twentieth Day of October 1981

[SEAL]

Attest:

GERALD J. MOSSINGHOFF

Attesting Officer        Commissioner of Patents and Trademarks